Patented June 8, 1943

2,321,522

UNITED STATES PATENT OFFICE 2,321,522

MAGNESIUM CEMENT ARTICLE AND METHOD OF MAKING THE SAME

Ernest Sands, Trenton, N. J.

No Drawing. Application June 5, 1939,
Serial No. 277,455

18 Claims. (Cl. 18—47.5)

This invention relates to the production of decorative and structural materials from magnesium oxychloride cements, and more particularly to the production of art objects, decorative and building materials of high strength, high gloss, and which are substantially impervious to water.

Articles made from magnesium oxychloride cements have heretofore required expensive honing and polishing treatments to produce suitable finishes thereon. These products, even after the polishing process, are very porous and are unsatisfactory for use in places where they may come into frequent contact with water. To provide greater water resistance, it has heretofore been proposed to add waterproofing material such as asphalt and small quantities of paraffin to the cement mixtures. Some of these addition agents have destroyed the decorative effects of the article, and when added in sufficient quantity to have a sufficient waterproofing action, they have been deleterious to the strength of the hardened cement. Waxes in particular, when added in any substantial amounts to magnesium oxychloride cements by methods heretofore proposed, frequently accumulate into relatively large globules, leaving a large number of pores and weakening the finished articles without substantially improving their water resistance.

It is, therefore, an object of this invention to produce articles from magnesium oxychloride cements having high strength, and which are substantially unaffected by water.

It is another object of this invention to produce highly polished objects from magnesium oxychloride cements without a honing operation.

Another object of this invention is to provide a method of uniformly mixing water-repelling and gloss-producing ingredients into magnesium oxychloride cements at ordinary temperatures.

Another object of this invention is to produce articles in which the water-repelling and gloss-producing material is substantially uniformly distributed throughout the structure.

A further object of this invention is to provide improved methods for producing magnesium oxychloride cement articles.

These objects may be accomplished by mixing a relatively large proportion of a waxlike material, such as an amorphous wax, uniformly into mixtures having ingredients to form magnesium oxychloride cement. The mixtures may contain, in addition to the constituents to form such magnesium cement pastes, waxlike material, coloring materials such as suitable pigments or dyes, filling materials, and wax softeners.

When the wax is uniformly incorporated into an article produced from magnesium oxychloride cement its structural strength is not objectionably impaired even though the wax amounts to a substantial proportion of the material. The articles produced have exceptional gloss, and, when a sufficient quantity of waxlike substance is added, they have exceptional water-resisting qualities.

In the preparation of articles in accordance with this invention, a magnesium oxychloride cement or paste is prepared by mixing a magnesium chloride solution having a density of about 26° to 32° Baumé at 70° F. with a suitable quantity of magnesium oxide. The wax to be mixed with this paste should be reduced to a consistency or viscosity to correspond approximately with that of the paste. This may be accomplished by mixing the wax with a softener such as volatile, miscible materials, mineral oils, and vegetable oils of the drying or non-drying type. The wax may also, if desired, be melted and added to a hot paste having a temperature higher than the melting point of the wax. The specific procedure to be used for adding the wax depends upon the character of finish desired in the final product, the method of casting or molding to be used and upon other factors hereinafter considered. The wax or waxlike constituent may be incorporated into the cement or paste mixtures together with suitable filling materials, and coloring materials to produce, according to the procedure used and the character, quantity, and diversity of the various ingredients used, a multitude of pleasing effects.

When the wax is mixed with powdered or comminuated fillers, such as sawdust, powdered flint, or other fillers prior to the addition of cement comminuted materials to the magnesium cement paste, the added filling materials appear not to be wetted by the cement paste and produce desirable mottled and laminated effects. These effects are particularly noticeable if the wax and filling materials are of a color different from the magnesium cement. When filling materials of a non-oily and wettable nature are thoroughly mixed into the cement paste without a prior mixing with the wax, the mass is more homogeneous and the filler is usually less distinctly visible. The filler may also serve as a reinforcing ingredient.

It has been found that the magnesium cement paste can be so made up that the mixture will set in a relatively few minutes, or it can be made up so that the setting will be delayed for an hour or more.

When it is desirable to produce magnesium cement articles in large quantities which will begin to set and harden quickly, it is preferred that the wax be melted, mixed with a substantial quantity of filler and added in the melted or pastry condition to the warm or hot magnesium cement paste. In this modification of the process any suitable waxlike gloss producing material such as wax produced by extraction from petroleum may be used. When a relatively high gloss is desired preferably a high melting wax, that is one having a melting point of about 140° F., is melted and thoroughly mixed with a suitable filler such as, for example, plaster of Paris, magnesium carbonate, magnesium oxide, powdered flint, sawdust, wood flour, marble chips and the like.

The filling materials are reduced to the desired fineness and may be added to the melted wax and thoroughly mixed therewith to form a substantially homogeneous mixture, or the filling material may be coated with the wax or wax composition in any suitable manner, such as by spraying. This procedure causes the particles to be impregnated or coated with the wax or wax composition, and thus there is less tendency for the particles to be wetted in the final composition.

In order to produce articles having a relatively high gloss and which are water-resistant, wax should be present in sufficient amount to substantially coat the particles of filler mixed therein and preferably to provide an excess of wax for filling voids in the cement. To avoid having lumps of finely divided material present, the wax-filler mixture may be allowed to cool and solidify while the mixture is being stirred. If a substantial quantity of filler or aggregate has been added to the molten wax, the cooled product consists of finely divided solid particles coated with wax. By sifting or screening this product, any lumps present may be removed from the powder and these may be reduced in size by suitable means.

The wax-filler mixture may be added in a liquid condition, or it may be added to the oxychloride magnesium cement paste in a semi-liquid or finely subdivided condition. If the homogeneous wax and filler mixture is fluid, it is preferable to combine it with the hot magnesium cement paste. In this case the paste is prepared by adding a magnesium chloride solution of about 26° to 32° Baumé heated to about 15° or 20° F. above the melting point of the wax to be used, to a sufficient quantity of magnesium oxide to produce a creamy consistency. The quantity of wax should preferably be about 20% by weight of magnesium cement paste but the amount added may be varied within rather wide limits. The wax mixture should have about the same consistency as the paste and should be added as soon as possible after the magnesium paste is prepared in order to be thoroughly incorporated before solidification of the paste begins.

If the wax-filler mixture is in a finely subdivided state it may be added to the magnesium cement in the absence of heat and intimately mixed therewith to form a homogeneous mass. When a mixture is made incorporating such finely divided material, the wax utilized should preferably be of the soft or amorphous variety to facilitate the distribution of the wax during the mixing. Usually, however, it is preferable to combine the wax-filler mixture and the magnesium cement paste in fluid condition.

The time at which solidification of a magnesium oxide-chloride cement begins is governed by the initial mixing temperature and the relative concentration of the magnesium chloride solution. With more concentrated solutions and higher temperatures a more rapid set-up occurs, and at about 140° F. with a 32° Baumé magnesium chloride solution, the exothermic reaction between the chloride and oxide commences quite promptly and solidification begins in a short time such as three or four minutes or so.

If articles are to be cast from the wax and cement mixture having a temperature around 140° F. they should, therefore, be poured relatively quickly, that is, three minutes or so, and even then solidification may have progressed sufficiently to prevent complete filling of a mold without the application of external pressure. It has been found, however, when the wax and magnesium cement paste be allowed to solidify in lumps of any convenient size, and when these lumps are crushed into a powder that the powder thus produced is suitable for use as a molding powder and may be placed in a mold and the particles united, by the application of suitable pressure, to form solid articles having a desired shape. The molding powder should be used before the reaction has progressed sufficiently to prevent cohesion of the powder and more than a few hours' delay after the formation of the paste is usually undesirable. The wax present in the molding powder serves to delay the reaction of the cement, and in some cases the powder may be used after a day or so. In the preparation of articles from the molding powder, a press capable of applying considerable pressure, which may be from a few hundred pounds per square inch to several thousand pounds per square inch may be used, and the products may be removed from the mold or die after a sufficient pressure to produce cohesion of the powder has been applied. Upon removal from the press, the products are sufficiently strong for shipment, but maximum strength is reached only after an interval of two or three weeks. The die or mold used in forming the product from the molding powder should preferably be heated to about the melting point of the wax or waxlike material used. When the mold is heated in this manner the wax appears to act both as a mold lubricant, which gives increased polish to the molded article, and as an agent which improves the cohesion of the ingredients.

Instead of producing a molding powder from the above described hot magnesium cement paste, one may, while the mix is still fluid, but after it becomes too viscous to allow the escape of entrapped air so as to produce smooth articles in casting molds, pour the mixture into temporary or "precast" molds and allow it to set up for a sufficient time to be removed from these molds. The precast molds may have rough finishes and be incapable of withstanding much pressure, and may serve only to produce a mass of paste which is the general shape or contour desired in the finished article. Such mass removed from the temporary mold may be inserted in a mold having suitable finish and the desired article produced by the application of sufficient pressure. The preformed material should be pressed in the finished form before hardening has progressed to such an extent that fracture occurs. The finish mold may be heated if desired.

When it is undesirable to produce magnesium oxychloride articles in molds which require the application of external pressure, the temperature of the magnesium oxychloride paste should be held much below 140° F. in order to avoid the rapid solidification and to permit the material to have sufficient flowability to completely fill the mold even though it be of intricate design.

By adding a softener, such as a volatile solvent, mineral oil, or vegetable oil, to the wax, the viscosities or consistencies of the wax softener mixture and the magnesium oxide paste may become substantially identical at a lower temperature and a uniform mixture may then be obtained. Non-dry and non-volatile oils reduce to a considerable extent the gloss in the finished article, and when high gloss is desired, the consistency of the wax should be reduced by means of a volatile material such as gasoline, petroleum naphtha, acetone, and the like.

In the preparation of materials, when high gloss finish is not desired, the wax is mixed with sufficient mineral oil to produce a mixture having a melting point of about 100° F. If a grained or mottled effect is desired, a quantity of filler such as sawdust, magnesium carbonate, powdered flint, etc. is mixed into the melted wax and softener mixture to produce a mixture having a creamy consistency. The creamy mixture thus prepared is heated and stirred into a warm magnesium paste which may be prepared by mixing sufficient magnesium oxide with a magnesium chloride solution heated to about 10° or 15° F. above the melting point of the wax, oil and filler mixture. The magnesium chloride solution preferably should contain any filler desired for reinforcing purposes. The consistencies of the wax, oil, and filler cream and the magnesium paste should be substantially the same in order to produce a homogeneous mass, and when the wax, oil, filler cream is too viscous a small amount of a volatile solvent such as gasoline may be added to reduce its viscosity. The wax used may, if desired, be of a type requiring a softener to be mixed therewith to lower the melting point to around 100° F. Thus, one may use commercial waxes or petrolatums having oil already mixed therewith and which are sometimes of little value in the petroleum industry.

Magnesium oxychloride paste heated to about 115° F. should be poured in less than about thirty minutes from the time of mixing, and when a longer time between the mixing and pouring operations is desired, the paste should be mixed and the wax should be added at a lower temperature. In this case the wax, or the wax containing some oil, may be mixed with a volatile miscible material or drying oil to reduce its consistency or viscosity to correspond with that of the magnesium paste so that the wax may be incorporated therein at a temperature of about 70° or 80° F. When a high gloss is desired, the mineral oil and drying oil should be omitted and the consistency of the wax reduced by means of the volatile material alone. The wax, volatile material, mixture may be mixed as in the above mixes, with pigments, dyes, fillers, etc. before it is combined with the magnesium oxychloride paste to produce grain effects, etc.

When a 32° Baumé magnesium chloride solution is used in the preparation of the magnesium paste, the magnesium oxide should constitute between 25 to 45% of the total volume of the magnesium oxide, magnesium chloride solution mixture. With a larger proportion of the chloride solution the finished article tends to become deliquescent and with an excess of magnesium oxide, cracks are likely to occur. When a more dilute magnesium chloride solution is used a somewhat larger quantity should be used and when fillers are present in the paste, the quantity is increased to give the desired consistency. The magnesium chloride solution may have a concentration between about 18° and about 35° Baumé, but a concentration of 26° Baumé is preferred in most instances.

If, in the preparation of the above mentioned hot paste with 32° Baumé magnesium chloride solution, solidification begins more rapidly than desired, one may reduce the consistency and delay the reaction by adding a small amount of water to the paste. The water, however, should preferably not be sufficient to reduce the magnesium chloride concentration below about 26° Baumé.

As hereinbefore mentioned, the fillers may be added to the magnesium chloride paste with the wax or the wax softener mixture to produce grain effects, or they may be added to the magnesium oxychloride paste directly to produce a homogeneous mass. In any case, the total quantity of fillers, waxes, softeners and the like added should not have a volume more than about three times that of the magnesium oxide used and it is preferable that the magnesium oxide be about equal in volume to the total quantity of filler, wax, and softener.

When small amounts of filler, such as plaster of Paris, magnesium chloride, Florentine cement, aluminous cements, silex, powdered flint, are mixed with the magnesium paste directly, they may serve to improve the strength of the mixture, and for this reason it is preferable that some of the filling materials be mixed directly into the magnesium paste even though grain effects are desired.

In the production of magnesium cement articles according to my process, any waxlike or gloss producing material which is substantially inert to magnesium cements may be used with reasonable success, but higher melting waxes produce improved gloss. Amorphous waxlike materals and wax and oil emulsions such as the petrolatums also produce superior waterproofing properties. The waxlike material or the wax and softener mixture should, however, have a melting point higher than the temperature to which the finished article will be subjected. In cases where a volatile material or drying oil is mixed with the wax it is sufficient if the residue obtained after the evaporation of the volatile material or solidification of the drying oil in the mixture, have a melting point higher than the temperature encountered in use. The quantity of wax added to the magnesium cements may vary within rather wide limits according to the conditions under which the article is to be used and according to the finish desired. For articles which are in constant contact with water or for those intended for outdoor use, a larger quantity of wax or wax and oil mixture is desirable for waterproofing purposes.

When a relatively high melting point wax is added to the magnesium paste without a wax softener or when a wholly volatile softener is used, an increase in gloss is accompanied by an increase in wax content until a quantity equivalent to about 20% of the weight of the magnesium oxide-chloride paste has been added. When a drying oil or other non-volatile softener is mixed with the wax or when a petrolatum is used, the oil also acts as a waterproofing medium and a correspondingly smaller quantity of wax may be used. The preferred quantity of wax and oil mixture or petrolatum is about 15% by weight of the magnesium paste. Articles having more than 15% of the non-drying oil and wax mixture or more than 15% of a petrolatum or similar wax and softener mixture have an oily feel and may be undesirable for some purposes. The wax or wax and softener mixture may be added to magnesium cements in amounts equivalent to as much as 40% of the weight of the magnesium paste without too greatly reducing the strength of the products, but more than about 40% of these materials tends to prevent good cohesion of the cement. When the wax amounts to less than about 4 or 5% of the magnesium cement the products, while somewhat water-repellant, are not sufficiently water-resistant for certain applications.

Example 1

The following examples in which parts are by volume illustrate the preparation of magnesium cement articles according to this invention:

| | Parts |
|---|---|
| Magnesium oxide | 50 |
| Wax (melting point 140° F.) | 30 |
| Plaster of Paris | 10 |
| Powdered flint | 10 |

The powdered flint and the plaster of Paris are stirred into the melted wax to produce a creamy mass. The magnesium oxide is mixed with sufficient magnesium chloride of about 32° Baumé, heated to about 155° F. to produce a magnesium oxychloride of a creamy consistency. As soon as possible after the preparation of this magnesium cream, the molten wax, flint, and plaster of Paris mixture, which has about the same consistency as the magnesium oxychloride, is rapidly agitated therewith.

The material is poured out into a suitable container and allowed to set for a period of ten or fifteen minutes in order to form a lumpy mass. This is promptly crushed into a molding powder which is placed in a suitable press to produce articles of high gloss and in which substantially all voids are filled with the wax. By adding suitable coloring materials or pigments, examples of which are aluminum oxides dyed with the various organic dyes or other pigments, a variety of effects can be produced.

Example 2

| | Parts |
|---|---|
| Magnesium oxide | 60 |
| Powdered flint | 48 |
| Sawdust | 2 |
| Wax (melting point 140° F.) | 20 |
| Oil | 30 |

The wax is melted, mixed with oil, and the sawdust and flint thoroughly incorporated therein to produce a mixture having a creamy consistency. The magnesium oxide is separately mixed with sufficient 26° Baumé magnesium chloride solution, heated to 150° F. to produce a cream having approximately the same consistency as the melted wax, oil, and filler mixture, which may also contain suitable coloring material such as pigment, dyes and the like, and which is thoroughly stirred into the magnesium paste. The material is then poured into a suitable mold and allowed to set for a period of at least seven or eight hours to produce articles having high water resistance.

Example 3

| | Parts |
|---|---|
| Magnesium oxide | 5 |
| Spent fuller's earth (combined with organic matter and obtained as a residue from petroleum filtrations) | 2 |
| Oil and wax or petrolatum | 4 |
| Naphthalene | 2 |

An homogeneous mixture of the oil, wax, and naphthalene, melting at about 100° F. was prepared by mixing oil and naphthalene with the melted wax. This was stirred into a paste prepared by mixing a suitable quantity of 30° Baumé magnesium chloride solution heated to 115° F. and containing a fuller's earth with the magnesium oxide to produce a creamy mixture. Articles such as clothes receptacles, etc., cast from this material, have a high naphthalene odor which persists for a relatively long period of time. The spent fuller's earth being of an oily nature is not wetted by the magnesium oxychloride cement, with the result that a pleasing mottled effect is produced.

Various odoriferous materials, such as perfumes, aromatic oils, etc., may be substituted for the naphthalene in the above mix to produce a variety of materials having distinctive odors.

Example 4

| | Parts |
|---|---|
| Wax (high melting point) | 25 |
| Talc | 10 |
| Powdered flint | 30 |
| Magnesium oxide | 50 |
| Pigment coloring material | 3 |
| Plaster of Paris | 10 |

The talc and flint and pigment are mixed into melted wax and allowed to cool while it is constantly stirred, in order to produce a powder. This powder is then screened through a 100-mesh screen and heated to the melting point of the wax. The mixture is then added to a hot magnesium oxychloride paste prepared by adding sufficient 32° Baumé magnesium chloride solution heated to 155° F. to the magnesium oxide to produce a creamy consistency. The plaster of Paris should preferably be mixed with the magnesium chloride solution before its addition to the magnesium oxide. The material is cast into precast or temporary molds and allowed to set. As soon as the materials can be removed bodily from the temporary molds, they are pressed into a finished mold under considerable pressure such as 1000 to 2000 pounds per square inch. The articles removed from the mold are sufficiently strong to be used immediately and have a pleasing appearance with a high gloss and are impervious to cold water.

Example 5

| | Parts |
|---|---|
| Magnesium oxide | 60 |
| Amorphous wax | 20 |
| Acetone | 30 |
| Flint | 48 |
| Sawdust | 2 |

The amorphous wax, softened with acetone, is mixed with the flint and sawdust to produce a mixture having a creamy consistency. This mixture is stirred into magnesium oxide-chloride paste prepared by mixing the magnesium oxide with a sufficient quantity of 26° Baumé magnesium chloride solution to produce a paste having a consistency of the wax mixture. The material is cast into molds having a smooth surface and allowed to set for a period of ten or more hours. The solvent evaporates from the article, leaving a surface having high gloss and the articles produced have high strength and excellent water resistance.

Other suitable filling materials such as magnesium carbonate, wood flour, marble chips, graphite, slate, metallic crystals, Cellophane chips, may be substituted for those used in the above examples. Magnesium carbonate, in particular, when added in place of the filler in the above examples, produces a material having excellent vibratory properties, and the material may be used in the manufacture of musical instruments, such as violin bodies, sounding boards, and the like.

The products produced according to this invention are water-resistant, have a pleasing finish, and when cast or pressed in smooth finished molds have an exceedingly high polish. The products containing a wax softened with an oil, while having a natural satin finish, may be quickly and easily polished by rubbing their surfaces with a soft cloth. Since the wax is distributed uniformly throughout the body of the material the polish may be easily renewed even though the original surfaces were abraded.

It will be seen that, a wax or waxlike material may be mixed with pigments with or without fillers, and furnished as a composition for addition to magnesium oxychloride cements.

The term wax is intended to include material of a similar nature such as chlorinated naphthalene and other mineral and vegetable waxes which are substantially inert in the presence of magnesium oxychloride cement.

It is obvious that various modifications may be made in the above described processes without departing from the principles of the invention herein set forth, and it is my intention not to limit the appended claims except as may be necessitated by the prior art.

What I claim is:

1. In a process for producing articles from magnesium oxychloride cements, the steps which comprise preparing an unemulsified wax material in flowable consistency, combining said flowable wax material, in the absence of an emulsifying agent, with an aqueous magnesium oxychloride paste, prepared by mixing magnesium oxide magnesium chloride with water.

2. In a process for producing articles from magnesium oxychloride cement, the steps which comprise melting a wax material, mixing filler with said melted wax material, and adding the mixture, in the absence of an emulsifying agent, to an aqueous magnesium oxychloride paste heated above the melting point of said wax material.

3. The process of producing articles from magnesium oxychloride cements, which comprises forming a hot aqueous paste of magnesium oxide and magnesium chloride, allowing solidification to begin and then forming the solidified paste in a mold with the application of external pressure.

4. The process for producing articles from magnesium oxychloride cements, which comprises forming a paste comprising water, magnesium oxide, a wax and magnesium chloride, allowing preliminary solidification to begin, and forming the material into the desired shape by the application of sufficient pressure.

5. The process for producing articles from magnesium oxychloride cements, which comprises forming a paste comprising water, a wax, magnesium oxide and magnesium chloride, pouring the paste into a suitable mold, allowing the material to solidify until it can be removed in one piece from the mold, and forming the material into the desired shape by the application of sufficient pressure.

6. The process for producing articles from magnesium oxychloride cements, which comprises forming a paste comprising water, magnesium oxide and magnesium chloride pouring the paste into a suitable temporary mold, allowing the material to solidify until it can be removed in one piece from the temporary mold, removing the solid material from said temporary mold, inserting it in a permanent mold, and forming the material into the desired shape by the application of sufficient pressure.

7. The process for producing articles from magnesium oxychloride cements, which comprises forming a paste comprising water, a wax, magnesium oxide and magnesium chloride, allowing the material to solidify, crushing the solidified material to form a molding powder, and forming the molding powder into an article of the desired shape by the application of sufficient pressure.

8. The process for producing articles from magnesium oxychloride cements, which comprises melting an unemulsified wax, adding a filling material to said melted wax to form a cream, mixing said cream with a paste which is heated above the melting point of said wax and comprising magnesium oxide, magnesium chloride, and water, allowing the hot paste of magnesium oxychloride and wax to solidify, and then forming the material in a suitable mold by the application of pressure.

9. The process for producing articles from magnesium oxychloride cements, which comprises melting a wax, adding a filling material to said melted wax to form a cream, mixing said cream with a paste which is heated above the melting point of said wax and comprising magnesium oxide, magnesium chloride, and water, allowing the hot paste of magnesium oxychloride and wax to solidify in temporary molds until it can be removed as a solid therefrom, removing the material to a permanent mold, and forming in suitable shape by the application of sufficient pressure.

10. The process for producing articles from magnesium oxychloride cements, which comprises melting an unemulsified wax, adding a filling material to said melted wax to form a cream, mixing said cream with a paste which is heated above the melting point of said wax and comprising magnesium oxide, magnesium chloride, and water, allowing the hot paste to solidify, crushing the solidified material into a powder, and forming the powder into a solid body of the desired shape by the application of sufficient pressure.

11. A process for producing articles from magnesium oxychloride cements, which comprises preparing a mixture of wax and oil, mixing said mixture, in the absence of an emulsifying agent, with an aqueous paste comprising magnesium oxide, magnesium chloride, and water, said mixture of wax and oil having substantially the same consistency as said magnesium oxychloride paste.

12. A process for producing articles from magnesium oxychloride cements, which comprises preparing a mixture of unemulsified wax and wax softener, mixing said mixture with an aqueous paste having a temperature higher than the melting point of said mixture and comprising magnesium oxide, magnesium chloride, and water.

13. A process for producing articles from magnesium oxychloride cements, which comprises preparing a mixture of unemulsified wax and wax softener, combining a filling material with said mixture to form a cream, and mixing said cream into an aqueous paste of magnesium chloride, magnesium oxide, and water, said cream and said paste having substantially the same consistencies.

14. A magnesium oxychloride cement article having unemulsified wax and mineral oil substantially uniformly dispersed throughout its interior and in sufficient quantity to improve the polish and water-repellance of said article.

15. A magnesium oxychloride cement article having an emulsified wax substantially uniformly dispersed throughout its interior, said wax being present in amounts equal to between about 4 and 40% of the magnesium oxide, magnesium chloride, and water contained in said article.

16. A process for producing articles from magnesium cements, which comprises coating a filler with a wax, incorporating the coated filler in a magnesium cement, preparing a molding powder from said cement mixture, placing the powder in a mold in a condition that it will coalesce only under pressure, and applying pressure to the material to cause it to take the shape of the configurations of the mold.

17. The method of producing articles from magnesium oxychloride cement compositions, which comprises forming a paste of magnesium oxide, magnesium chloride, and water, and mixing with the paste an unemulsified wax having a consistency at the temperature of the paste substantially corresponding to the consistency of the paste, whereby a uniform, homogeneous mixture of the wax and the magnesium oxychloride cement paste may be obtained in the absence of an emulsifying agent.

18. The method of producing articles from magnesium oxychloride cement compositions, which comprises forming a paste of magnesium oxide, magnesium chloride, and water, and mixing with the paste an unemulsified wax having a consistency at the temperature of the paste substantially corresponding to the consistency of the paste, said wax being present in the amount of 4% to 40% of said paste, whereby a uniform, homogeneous mixture of the wax and the magnesium oxychloride cement paste may be obtained in the absence of an emulsifying agent.

ERNEST SANDS.